Sept. 12, 1944. H. W. HAPMAN 2,357,796
FLIGHT CONVEYER
Filed Aug. 28, 1941 4 Sheets-Sheet 1
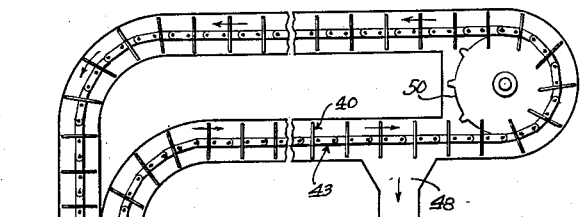
Fig. 1.
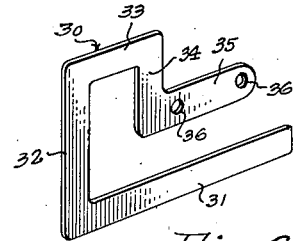
Fig. 6.
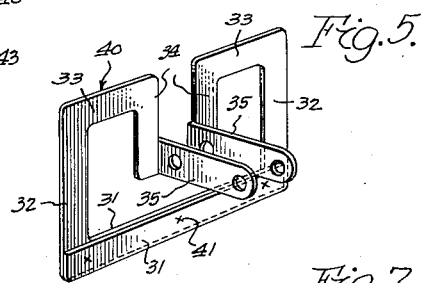
Fig. 5.
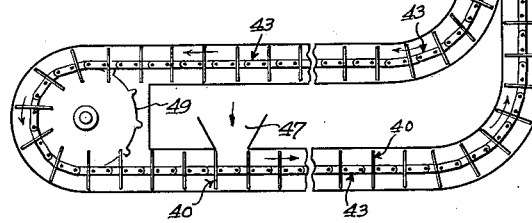
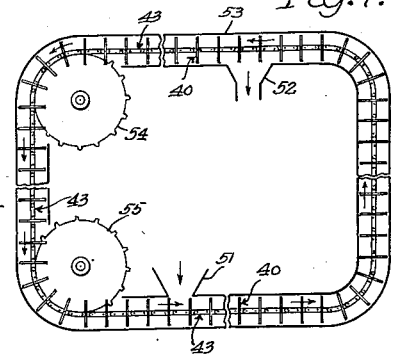
Fig. 7.
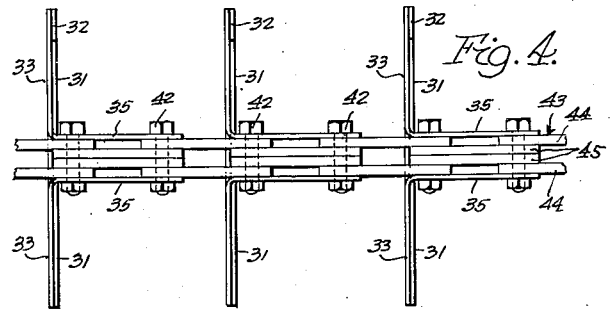
Fig. 4.
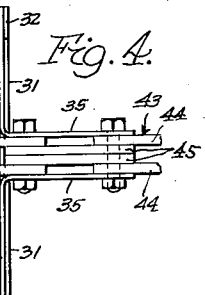
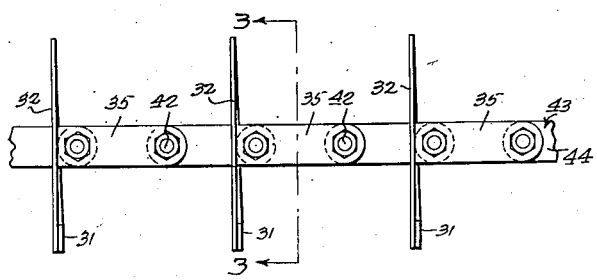
Fig. 2.
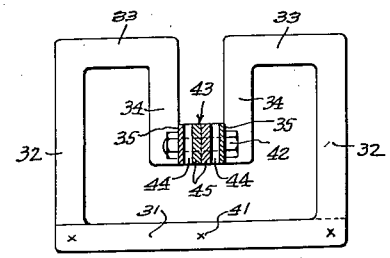
Fig. 3.
Inventor
Henry W. Hapman
By
Barthel & Knight
Attorneys

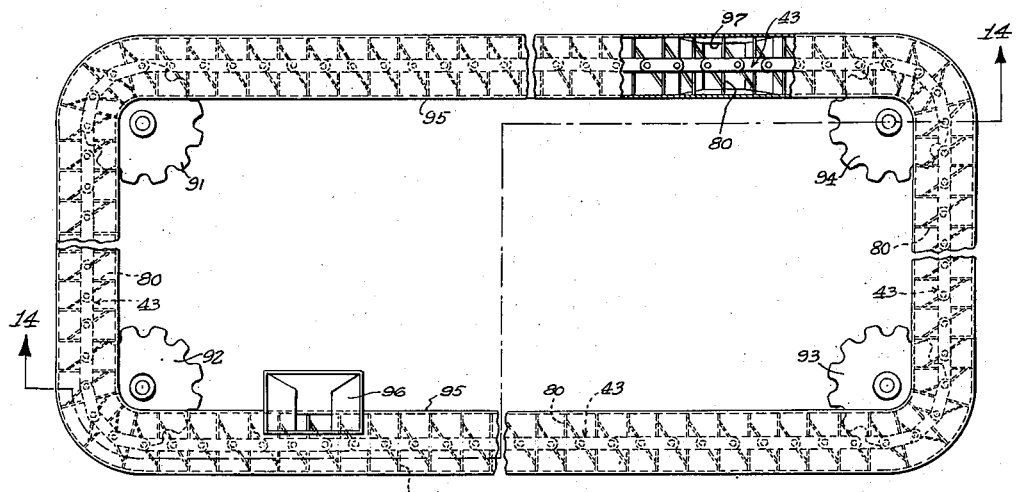
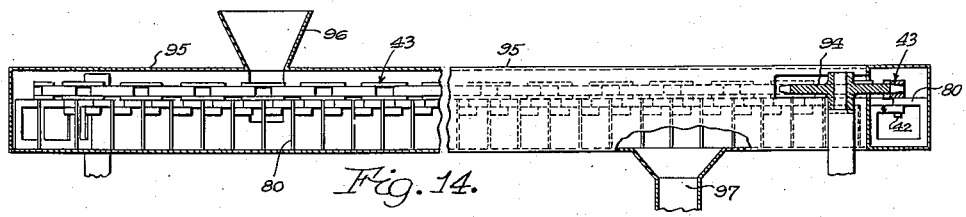
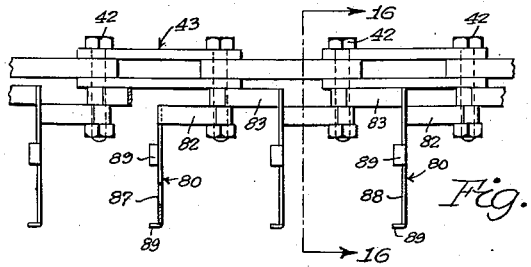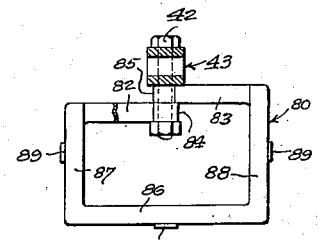
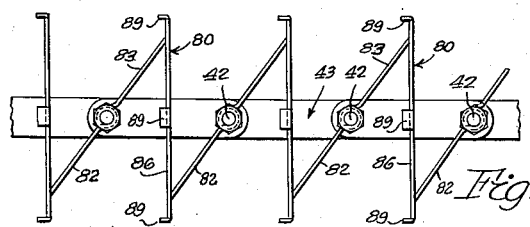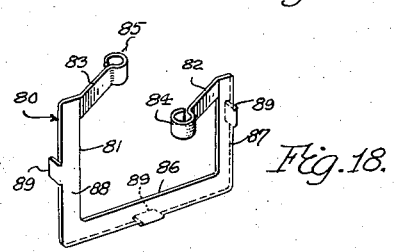
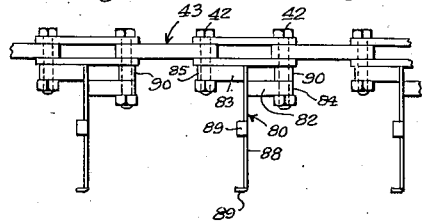

Patented Sept. 12, 1944

2,357,796

UNITED STATES PATENT OFFICE 2,357,796

FLIGHT CONVEYER

Henry W. Hapman, Detroit, Mich.

Application August 28, 1941, Serial No. 408,563

12 Claims. (Cl. 198—172)

This invention relates to conveyers, and in particular to open flight conveyers wherein the conveyer flights have apertures through which some of the conveyed material may pass, and wherein conveying is accomplished by the induced flow of the conveyed materials.

One object of this invention is to provide a flight conveyer having open flights constructed of sheet metal stampings, preferably of spring steel to provide resilience.

Another object is to provide a flight conveyer having open flights which are constructed of sheet metal stampings and are capable of being attached to standard forms of sprocket chains.

Another object is to provide a flight conveyer having open flights constructed of sheet metal stampings and concaved either toward or against the direction of motion of the conveyer.

Another object is to provide a flight conveyer having open flights with arms secured to alternate links or pivot pins of the conveyer chain in such a manner that each flight has one arm secured to one pivot pin and the other arm secured to an adjacent pivot pin.

Another object is to provide a flight conveyer having open flights constructed of resilient material and adapted to convey material when moving in either an upright or in an inverted position.

Another object is to provide a flight conveyer having open flights constructed of sheet metal stampings and secured to the pivot pins of a conveyer chain on opposite sides of the links thereof so as to provide a flight conveyer with the conveyer chain moving approximately through the center of the conveyer conduit and away from the side walls thereof.

Another object is to provide an open flight conveyer of the runaround or horizontal type wherein the open flights depend from a conveyer chain which moves through the conveyer conduit near the top wall thereof, each conveyer flight having a pair of free arms, one arm being connected to one pivot pin of the chain and the other arm being connected to an adjacent pivot pin so that the arms are arranged obliquely to the plane of the conveyer flight.

This application is a continuation in part of my co-pending application Serial No. 316,706, filed February 1, 1940 and issued June 23, 1942, as Patent No. 2,287,378.

In the drawings:

Figure 1 is a diagrammatic side elevation, with the side wall of the conveyer conduit removed, of an open flight vertical run conveyer arranged according to a preferred embodiment of the invention.

Figure 2 is an enlarged side elevation of a portion of the conveyer shown in Figure 1.

Figure 3 is a cross section along the line 3—3 in Figure 2.

Figure 4 is a top plan view of the conveyer portion shown in Figure 2.

Figure 5 is a perspective view of one of the conveyer flights used in the conveyer shown in Figures 1 to 4 inclusive.

Figure 6 is a perspective view of one of the conveyer flight blanks from which the conveyer flight of Figure 5 is constructed.

Figure 7 is a diagrammatic side elevation of an open flight conveyer installation using the conveyer chain and flights of Figures 2 to 6 inclusive, but arranged so that the conveyer flights on the lower run operate right side up whereas those on the upper run operate upside down, conveying being accomplished in either position.

Figure 13 is a top plan view, partly in section, of a horizontal or runaround conveyer employing a modified form of open conveyer flight.

Figure 14 is a vertical section along the broken line 14—14 in Figure 13.

Figure 15 is an enlarged detail side elevation of the conveyer chain and flights used in the runaround conveyer of Figures 13 and 14.

Figure 16 is a cross section along the line 16—16 in Figure 15 showing one of the conveyer flights.

Figure 17 is a bottom plan view of the conveyer portion shown in Figure 15.

Figure 18 is a perspective view of one of the conveyer flights used in the conveyers shown in Figures 13 to 23 inclusive.

Figure 19 is a side elevation similar to Figure 15, but showing a modification in which the flights are staggered at intervals along the conveyer chain.

General arrangement

In general, the invention consists of an open flight conveyer wherein the conveyer flights are composed of sheet metal stampings, preferably of resilient sheet steel. These stampings are either in a single piece for a complete flight, as shown in Figure 18 and used in the conveyers shown in Figures 13 and 23 inclusive, or else the flights are composed of two stamped blanks shown in Figure 6 and welded or riveted together or otherwise united as shown in Figure 5. The surfaces of the conveyer flights of the type shown in Figure 5 may be either flat (Figures 1 to 6 inclusive) or they may be concaved (Figures 11 and 12) either in the direction of travel (Figure 10) or away from the direction of travel (Figures 8 and 9).

The conveyer of Figure 1 employs open flights which use the bottom portion of the conveyer flight for conveying between the inlet and outlet. The modified conveyer of Figure 7 uses the bottom portion of the conveyer for conveying on the lower run, uses both the top and bottom portions for conveying on the vertical run, and uses the top portion (now inverted) on the upper run of the conveyer. The conveyer flight of Figure 5 is therefore adaptable for use either right side up or upside down.

Figure 9:
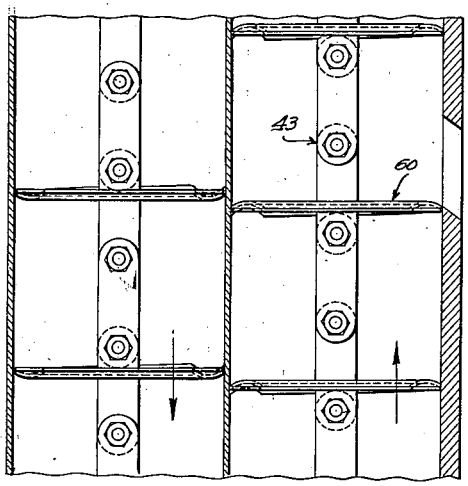
Figure 9 is an enlarged detail side elevation of adjacent portions of the conveyer shown in Figure 8, illustrating the dished shape of the flights, concaved in a direction opposite to the direction of travel.
Figure 8:
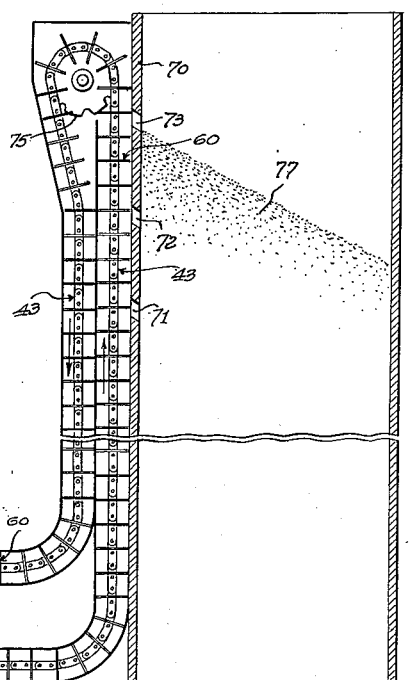
Figure 8 is a diagrammatic side elevation of a modified conveyer system with the conduit side wall removed and adapted for vertical run conveyers in bin-filling or similar operations.
Figure 10:
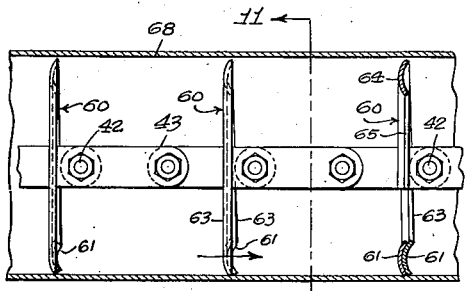
Figure 10 is a side elevation similar to Figure 9 but showing a modification wherein the conveyer flights are concaved in the direction of travel of the conveyer, such as for clean-out purposes.
Figure 11:
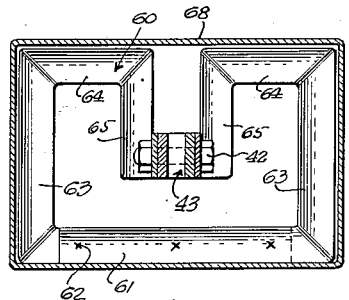
Figure 11 is a cross section along the line 11—11 in Figure 10 showing the concaved type of conveyer flight.
Figure 12:
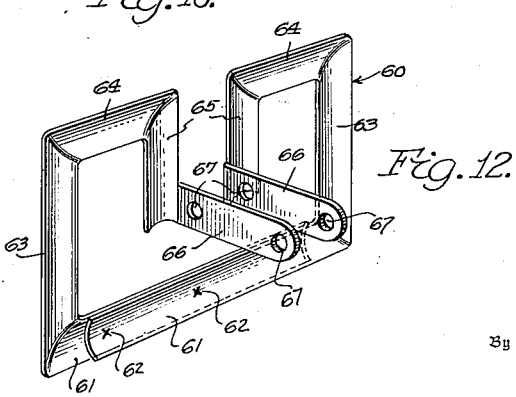
Figure 12 is a perspective view of the concaved form of conveyer flight shown in Figures 8 to 11 inclusive.
Figure 20:
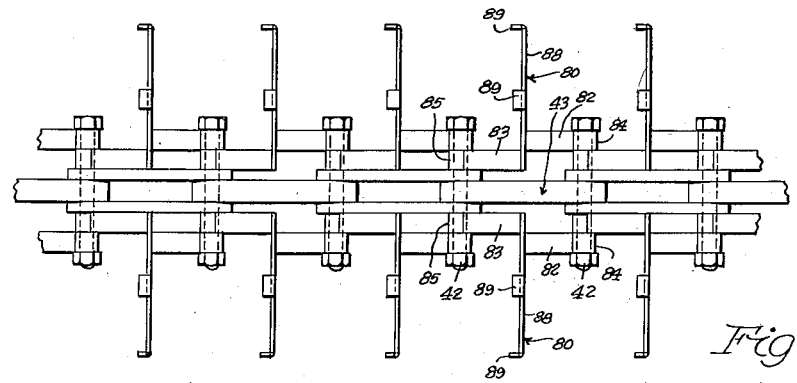
Figure 20 is an enlarged top plan view of a portion of a double-sided open flight conveyer employing the open flights of Figure 18 on opposite sides of the conveyer chain.
Figure 21:
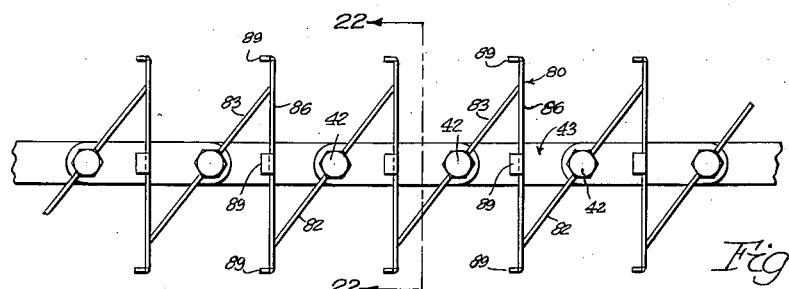
Figure 21 is a side elevation of the portion of the conveyer shown in Figure 20.

The modified conveyer of Figures 8 and 9 employing the concaved flights of Figures 11 and 12 is arranged for a vertical run conveyer for storing or bin-filling operations, the material being discharged first through the lowest bin opening and afterward into each successively higher opening after the lower openings have been filled to capacity, the material being carried up to the next opening as rapidly as each lower opening is sealed by the operation of the conveyer. In the conveyer of Figure 8, the flights are arranged concaved in the opposite direction from the direction of travel of the conveyer so that the material slips off the conveyer when the conveyer flight arrives at a discharge opening in the bin. The conveyer form shown in Figure 10 is arranged with the flights concaved in the direction of travel of the conveyer. This form of conveyer is used where the conveyer requires a clean-out action, and a slippage of the material off the flights is not desired, as in Figure 9.

The runaround conveyers shown in Figures 13 to 17 employ the modified open flight of Figure 18. The conveyer chain is arranged to move adjacent the top wall of the horizontal conveyer conduit, and the conveyer flights are dependent from the vertical pivot pins of the conveyer chain. The modification shown in Figure 19 employs flights arranged on every other set of pivot pins instead of between each set of pivot pins as in Figures 15 and 17.

The modified conveyers shown in Figures 20 to 23 employ the conveyer flight of Figure 18. The conveyer chain, however, moves approximately along a line through the center of the conveyer conduit with the pivot pins horizontal. The conveyer flights are mounted on opposite sides of the conveyer chain (Figure 22) and attached to opposite ends of the pivot pins. The modified conveyer shown in Figure 23 employs conveyer flights mounted in staggered sequence on opposite sides of the conveyer chain instead of in the regular sequence of Figures 20 and 21.

Two-piece conveyer flight construction

Referring to the drawings in detail, Figures 5 and 6 show a two-piece open conveyer flight provided from a pair of stamped blanks generally designated 30. Each blank 30 is formed from a sheet of J-shaped metal or other suitable material, preferably of resilient spring steel such as high carbon alloy steel or tempered-spring steel of commercial flat or plate form. The blank 30 consists of a bottom portion 31, a side portion 32, a top portion 33, a connection portion 34 and an attachment portion 35 with spaced holes 36 by which they may be attached to the pivot pins of the conveyer chain. The conveyer blanks 30 are originally of the same shape, either for the right-hand or left-hand side of the conveyer flight, but are bent differently during assembly.

The conveyer flight, generally designated 40, of Figure 5 is constructed from a pair of the blanks 30 of Figure 6, the attachment portions 35 thereof being bent so that they lie in parallel spaced relationship with their holes 36 in alignment and with their bottom portions 31 lying adjacent and in contact with each other. Bottom portions 31 are united by riveting or by welding, as at the points 41 indicated by the "×" marks in Figure 5. The completed flight 40 is thus of open construction, with attachment portions 35 capable of being secured to the pivot pins or posts 42 of a standard conveyer chain generally designated 43 (Figures 4 and 5). This conveyer chain 43 may be of any suitable type, the type shown consisting of outer links 44 and inner links 45 pivoted to one another by the pivot pins or bolts 42. The conveyer flights 40 are mounted upon the conveyer chain 43 with their attachment portions 35 outside the outer links 44 and extending from one link to another between the pivot pins thereof. The conveyer thus formed may be used in various arrangements, such as those in Figures 1 and 7.

In Figure 1, the conveyer conduit 46 is provided with an inlet 47 on a lower level and an outlet 48 on a higher level. Both the inlet 47 and outlet 48 of Figure 1 are on the lower run of the conveyer, even though the lower run has different portions on different levels. The conveyer flights 40 on the conveyer chain 43 therefore employ the bottom portions 31 and side portions 32 for the main portion of the conveying operation, and the conveyer flights 40 are not inverted during the conveying portion of the circuit. The conveyer chain 43 in the conveyer circuit of Figure 1 is supported at the opposite ends of its travel by the sprockets 49 and 50, one or both of these being driven from a source of power as may be desired.

In the conveyer circuit of Figure 7 the conveyer flights 40 move between an inlet 51 on the lower run of the conveyer and an outlet 52 on the upper run of the conveyer conduit 53 with a vertical run between them. Thus, the conveyer flights 40 are inverted while they are travelling along the conveying portion of the circuit. Along the lower run thereof, the bottom and side portions 31 and 32 accomplish most of the conveying action, whereas along the vertical run the bottom, side and top portions 31, 32 and 33 share the conveying action. Along the top or upper run of the conveyer of Figure 7, however, the upper portions 33, now inverted, and the side portions 32 perform the major part of the conveying action. Figure 7 thus illustrates an important advantage of the conveyer flight shown in Figure 5 in that it may be employed either right side up or upside down. The conveyer chain 43, however, travels along a path approximately passing along the center line of the conveyer conduits 46 and 53 respectively. In this manner the conveyer chain is spaced apart from the walls of the conveyer conduits, so that no rubbing and wear can occur from any contact between them. The conveyer chain 43 of Figure 7 passes over sprockets 54 and 55, one of these preferably being driven from a source of power and the other being employed as a take-up sprocket for adjustably taking up slack in the conveyer chain 43. The flat form of conveyer flight 40 of Figure 5 possesses such resilience that it can jump over obstructions and can flex when conveying conditions demand it.

*Two-piece concaved conveyer flight construction*

The conveyer flights 60 of Figures 9 to 12 inclusive are roughly similar to the conveyer flights 40 of Figure 5 and are similarly stamped from J-shaped blanks of a shape somewhat similar to Figure 6. The conveyer flights 60, however, are provided with bottom portions 61 welded or riveted to one another at 62, side portions 63, top portions 64, connection portions 65 and attachment portions 66 with holes 67 for the conveyer chain links. The bottom, side, top and connection portions 61, 63, 64 and 65, however, are concaved or dished, either in the direction of travel (Figures 10 and 11) or away from the direction of travel (Figures 8 and 9). The conveyer flights are concaved forwardly or in the direction of travel where the conveyer requires a clean-out action to pick up the material from the walls of the conveyer conduit 68 (Figure 10).

In the operation of the conveyer shown in Figures 10 and 11, this action is useful where the conveyer is located out of doors or in a cold situation and where material capable of freezing or solidifying is being conveyed. After the feeding of material to the conveyer has been terminated, the conveyer is operated for a sufficient period of time to clean out the conduit 68. During this period of time, the concaved portions of the conveyer flights 60 perform a scooping or scraping action and clean out the material so that none is left to freeze or solidify.

The conveyer 60 is concaved rearwardly or away from the direction of travel (Figures 8 and 9) where the conveyer conduit 69 is arranged to discharge into a bin 70 having filling openings 71, 72 and 73 arranged at different heights. The conveyer chain 43 upon which the flights 60 are mounted is similar to the chain described in connection with Figures 2 and 4, and is similarly supported at its opposite ends upon sprockets 74 and 75, one of which is preferably driven from a power source and the other adjustably mounted for taking up slack in the conveyer chain. An inlet 76 is provided along the lower run of the conveyer conduit 69 for receiving the material to be conveyed.

Since the conveyer flights 60 (Figure 9) are concaved rearwardly or away from the direction of travel of the conveyer chain 43, the material being conveyed slips off the conveyer flights 60 by reason of their lacking any flat surface on which material can lodge. The vibration accompanying the operation of the conveyer is sufficient to dislodge any such material having a tendency to stick to the conveyer flights.

In the operation of the conveyer shown in Figures 8 and 9, the material, such as grain, is fed into the inlet hopper 76 and is conveyed by the flights 60 along the lower run and up the vertical run of the conveyer. As the material 77 arrives at the discharge opening 71, it passes through this opening until the bin 70 is filled up to that level. Subsequent material is then carried upward past the opening 71 and discharged into the opening 72 until the bin 70 is filled up to this level. Consequently, the conveyer in the arrangement of Figure 8 automatically seals each opening 71, 72, 73, etc. as the level of the material 77 rises in the bin 70.

*Single-piece open conveyer flight*

Referring to Figure 18, the conveyer flight generally designated 80 shown therein is formed from a single blank having a central space 81 and having at the side nearest to the chain 43 a wide portion which is split upon a line so as to form two arms 82 and 83. These arms 82 and 83 are flat in the blank, but are bent into the forms shown in side view in Figure 17, the said arms 82, 83 terminating in loops 84 and 85 adapted to engage the transverse pins 42 which in this case take the form of bolts. Each flight 80 is provided with a bottom portion 86 and side portions 87 and 88 respectively connected to the arms 82 and 83. The portions 86, 87 and 88 are provided with integral bent-over lugs 89 or projections which are bent up at right angles to the plane of the conveyer flight. These lugs or projections 89 serve as feet for reducing wear upon the conveyer conduit when the chain is travelling through empty portions of the conduit on horizontal runs. Ordinarily, however, where the conveyer conduit is filled with material, the flight 80 practically floats in the material so that little wear occurs between the edges of the flight 80 and the inner walls of the conduit. The inner and outer arms 82 and 83 are connected to adjoining link pins 42, thereby forming a very simple and at the same time resilient connection between the chain 43 and the flight 80 since the inner and outer links 45 and 44 may in this case be of standard commercial construction, as shown in Figures 2 and 4 of the drawings. The flight 80, as shown, would be adapted for mounting continuously along the chain 43, but if found desirable to use alternate spacing of the flights 80, it will be necessary, in order to preserve their proper alignment, to insert bushings 90 (Figure 19) between the arms 83 and the outer faces of the adjacent links.

Runaround conveyer using single piece open flights

Figures 13 to 17 show a horizontal or runaround conveyer wherein the flights 80 shown in Figure 18 are suspended from the vertical pivot pins 42 of the conveyer chain 43. The latter runs in a substantially horizontal plane around sprockets 91, 92, 93 and 94, at least one of which is driven from a source of power. The conveyer conduit 95 is shown as following a substantially rectilinear path but it will be obvious that other arrangements may be used, depending upon the particular installation. The conveyer conduit 95 is provided with an inlet 96 and an outlet 97 for the material conveyed by the flights 80 through the conduit 95. As previously stated, the arms 82 and 83 of the flights 80 are arranged obliquely to the direction of travel of the conveyer chain 43, with the loops 84 and 85 extending around the pivot pins 42. In Figures 15 and 17, the flights 80 are distributed at regular intervals along the chain 43 between each pair of pivot pins 42. In the modification of Figure 19, however, certain of the spaces between pivot pins are free from flights, so that gaps appear in the conveyer. The omission of certain of the flights 80 makes the use of tubular spacers 90 advisable.

In the operation of the runaround conveyer of Figures 13 to 17 and 19, the material is fed into the inlet hopper 96 and is picked up and carried along by the conveyer flights 80 or by their induced flow action upon the particles of the material. The main part of the conveying action is done by the lower portion 86 and side portions 87 and 88, since the upper arms 82 and 83 are attached to the conveyer chain 43 which runs in an orbit near the inside top wall of the conveyer conduit 95.

Double flight conveyer

Figure 22:
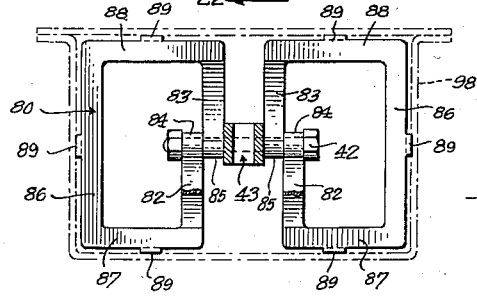
Figure 22 is a vertical cross section along the line 22—22 in Figure 21 showing a pair of conveyer flights of Figure 18 arranged on opposite sides of the conveyer chain and on opposite ends of the pivot pins thereof.
Figure 23:
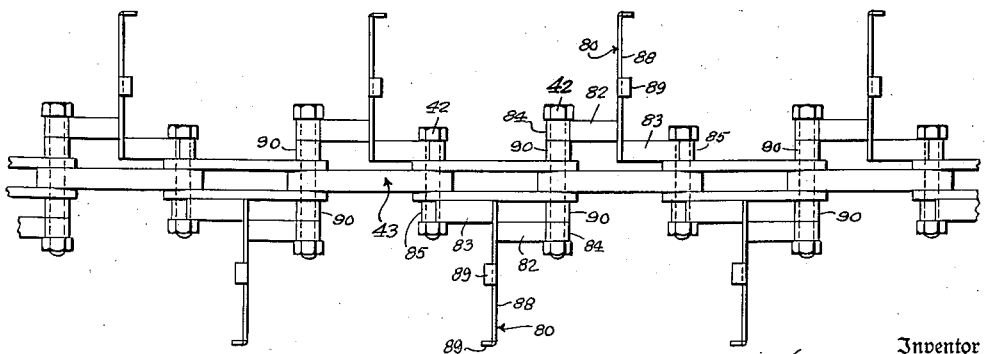
Figure 23 is an enlarged top plan view of a modification of the conveyer chain shown in Figures 20 and 21 wherein the conveyer flights are arranged in staggered sequence on opposite sides of the conveyer chain.

The modified conveyers shown in Figures 20 to 23 inclusive employ a pair of the conveyer flights 80 mounted on opposite sides of the conveyer chain 43, the arms 82 and 83 extending between alternate pivot pins 42 (Figure 22). The pivot pins 42 are thus horizontal and carry a flight 80 at each end instead of being vertical, as in Figure 16, and carrying a flight 80 at the lower end only. The conveyer chain 43 upon which the flights 80 are mounted is of a similar construction to that previously described. The modification shown in Figure 23 is similar to the form shown in Figures 20 and 21, except that certain of the flights 80 are omitted on opposite sides of the conveyer chain 43, thereby disposing the flights in staggered sequence on opposite sides of the chain. Tubular spacers 90 are again employed as in Figure 19 to provide the spacing effect otherwise provided by the loops 84 and 85 upon the conveyer flight arms 82 and 83.

In the operation of the conveyers shown in Figures 20 to 23 inclusive, the flights 80 and chain 43 are moved through the conveyer conduit 98 when power is applied to one or more of the sprockets meshing with the sprocket chain 43. The open conveyer flights 80 sweep through the conduit 98 and convey the material supplied thereto by reason of the induced flow imparted to the material. The conveyer chain 43 travels along a path substantially in the center line of the conveyer conduit 98, hence is free from contact with the walls thereof. Wear is thus reduced, and any contact which occurs is between the projecting lug or feet 89 and the conduit 98.

While a specific embodiment of the invention has been described and illustrated, it will be understood that various modifications may be made within the scope of the appended claims without departing from the spirit of the invention.

What I claim is:

1. In a flight conveyer, the combination, with a conduit arranged to follow a desired circuit, of a chain comprising alternate pairs of inner and outer links connected by transverse pivot pins, and a series of flights formed from plate stamping in the form of substantially J-shaped strips with overlapping portions for connection as a unit and having their outer marginal edges conforming to the interior surface of said conduit and having their free ends connected to the outer ends of adjacent pins.

2. A conveyer flight comprising a pair of substantially J-shaped plates arranged and secured together in reverse overlapping relation having arms extending inwardly from the free ends thereof, said arms having apertured ends for receiving the pivot pins of a conveyer chain.

3. In a runaround conveyer, a circuitous conduit, a conveyer chain extending around said circuit within said conduit, and open flights formed of J-shaped stampings, arranged in reverse overlapping relation to provide a unit and having arms connected to alternate pivot pins of said conveyer chain.

4. In a runaround conveyer, a conduit disposed in a circuit, a conveyer chain extending around said circuit within said conduit, and open flights formed of J-shaped stampings arranged in overlapping relation to provide a unit and having bottom and side members disposed in the same plane for each flight and arms extending from the free ends of said side members for connection with the pivot pins on said conveyer chain.

5. In a runaround conveyer, a conduit disposed in a circuit, a conveyer chain extending around said circuit within said conduit, and open flights formed of J-shaped stampings arranged in overlapping relation to provide a unit and having bottom and side members disposed in the same plane for each flight and arms extending from the free ends of said side members to pivot pins on said conveyer chain, said arms being arranged perpendicularly to the stampings and extending parallel with said links.

6. In a conveyer, a conveyer chain disposed in a circuit with its pivot pins extended outwardly on opposite sides of the chain, and open flights of sheet material formed of J-shaped stampings with overlapped portions and arranged in reverse overlapping relation to form a loop adjacent each end of said flight, each loop having arms bent at right angles thereto and secured to said pivot pins.

7. In a conveyer, a conveyer chain disposed in a circuit with its pivot pins extended outwardly on opposite sides of the chain, and open flights of sheet material formed of J-shaped stampings overlapped and arranged in reverse overlapping relation to form a loop adjacent each end of said flight, each loop having arms bent at right angles thereto and secured to said pivot pins, said flights being connected to said chain on opposite sides thereof.

8. A conveyer flight comprising a frame member formed of flat J-shaped stampings with portions overlapped and disposed in a substantially plane loop with connection portions extending inwardly from said loop and attachment arms extending from said connection portions substantially perpendicular to the plane of said loop.

9. A conveyer flight comprising a frame member formed of a pair of overlapped J-shaped stampings disposed in a substantially plane loop with connection portions extending inwardly from said loop and attachment arms extending from said connection portions substantially perpendicular to the plane of said loop, the portions of said frame member constituting said loop being concaved relatively to the plane thereof.

10. A conveyer flight comprising a pair of approximately J-shaped members of sheet material disposed substantially in a plane with the shafts thereof united, connection portions extending inwardly parallel to each other toward said shafts, and attachment portions extending outwardly from the ends of said connection portions substantially perpendicular to said plane.

11. A flight conveyer comprising a sprocket chain having links, spaced pivot pins pivotally interconnecting said links, and open flights formed of J-shaped stampings with overlapped portions defining an approximately plane loop-shaped form having attachment portions extending parallel to said links and mounted on said pivot pins on opposite sides of said chain.

12. A flight conveyer comprising a sprocket chain having links, spaced pivot pins pivotally interconnecting said links, and open flights formed of J-shaped stampings with overlapped portions defining an approximately plane loop-shaped form having attachment portions extending parallel to said links and mounted on said pivot pins, the surfaces of said flights being concaved relatively to the plane thereof.

HENRY W. HAPMAN.